INVENTOR

MARIO VEDOVELLI

BY Irwin S. Thompson

ATTORNEY

June 5, 1962 M. VEDOVELLI 3,037,899
PROCESS FOR MANUFACTURING MICROPOROUS FILTERING
DIAPHRAGMS FOR STORAGE BATTERIES
Filed April 18, 1958 2 Sheets-Sheet 2

INVENTOR
MARIO VEDOVELLI
BY Irwin S. Thompson
ATTORNEY

United States Patent Office 3,037,899
Patented June 5, 1962

3,037,899
PROCESS FOR MANUFACTURING MICROPO-
ROUS FILTERING DIAPHRAGMS FOR STOR-
AGE BATTERIES
Mario Vedovelli, Via Bernasconi 5, Cernobbio,
Como, Italy
Filed Apr. 18, 1958, Ser. No. 729,294
Claims priority, application Italy Apr. 20, 1957
10 Claims. (Cl. 156—179)

It is known that microporous diaphragms are widely used especially with electrical accumulators. Such diaphragms serve to enable the free passage of the ions, while preventing the passage of even the finest of solid particles. Different types of diaphragms may be subdivided into following groups:

(a) microporous diaphragms of natural origin, such as wooden plates;

(b) Diaphragms made of microporous synthetic substances, such as gum or microporous ebonite, microporous polyvinylchloride, microporous polystyrol and the like;

(c) Microporous diaphragms made from felts of cellulose fibres, with or without the addition of mineral fibres, protected and bound with synthetic resins;

(d) Microporous diaphragms made from very thin fibrous supports which are rendered microporous by means of the application of layers of porous powders or mineral gelatines, conglomerated with proper synthetic resins.

It is unnecessary to dwell on the diaphragms of group (a) which, though being economical to construct, do not meet the present strict technical requirements; as to group (b) although conforming to technical requirements, they are so expensive to produce, that they do not have a wide application. However, diaphragms of groups (c) and (d) meet technical requirements and are presently used on account of their low manufacturing cost.

According to a known proposal, diaphragms of groups (c) and (d) are obtained from a plate of absorbent felted material, composed of cotton and wooden fibres (mostly sulphite wooden paste) with the addition of thin mineral fibres, such as asbestos or glass. This plate is impregnated with solutions of thermohardening resins and then dried and polymerized, with or without the formation of ribs on the surface. Therefore the plate of absorbent felted material may be provided by a web of glass fibres, on one or both sides of which a layer of cellulose fibres will be spread and impregnated, as above referred to. According to another proposal, binders such as gum, celluloid, asphalt may be mixed with the mass of cellulose fibres prior to the manufacture of sheets.

Within these proposals, however, the problem arises in that diaphragms fail to provide the necessary mechanical resistance and it becomes necessary to exceed the plate thickness to the disadvantage of price and electrical characteristics of the diaphragms.

As regards diaphragms of the group (d) obtained by covering a very thin support with binders formed of porous or gelatinous pulverulent materials, conglomerated with thermohardening or thermoplastic synthetic resins, different manufacturing methods are also known; according to one proposal, a fibrous support is covered with inactive materials, such as fossil flour, aluminium oxide, ceramic powder and the like, fixed with gum latex; according to another proposal, a mixture of fossil flour with sodium silicate is applied on the fibrous support. According to other proposals, it is suggested to form microporous diaphragms by filling empty spaces of a very thin support with gelatinous mineral materials, as swelling bentonite, silical gel and the like, conglomerated with thermoplastic or thermohardening synthetic resins. Alternatively the coarse porosity of a granular support of Carborundum or the like, is occluded with a gelatine of double silicates of aluminium or magnesium hydrates.

The proposals also have the disadvantage that they require an excess of thickness of the plaster to be applied, to obtain really microporous structure, in order to avoid the formation of holes, due to the granulous structure of the plaster to be applied. This difficulty results in a price increase and reduces the electrical qualities, owing to the increasing of the separator resistance.

The main object of the present invention is a manufacturing of microporous diaphragms, according to which a very thin sheet of cellulose paper, acting as a macroporous layer, shall be sized on a microporous structural support, intended to confer on it mechanical resistance. In this manner the mentioned inconvenience for microporous separators of group (c) are removed, as mechanical resistance of the macroporous sheet being of no interest, it may be reduced to the smallest thickness.

By means of the process according to the present invention, the inconveniences arising in the matter of separators of group (d) are also removed due to the fact that an absolute microporosity of inert layers that are applied is not necessary any more, since absolute microporosity is made certain by the thin cellulose sheet. It is possible to apply a very thin film of binder with macroporous structure, which practically presents a negligible electrical resistance.

The accompanying drawings illustrate diagrammatically by way of example some embodiments of the invention:

As will be observed in FIG. 1 a diaphragm according to the invention is formed of a web V of glass or of other synthetic or natural acid proof fibres, or of a very thin cloth, smeared, as later described, in order to provide a macroporous structure, and an absorbent paper sheet C of cellulose or of cellulose combined with mineral or synthetic fibre mixtures. Sheet V is united with the paper sheet C by means of a synthetic binder (liquid) contained in a mixture applied on web V; this binder is absorbed by the paper C in such a way that its fibres will be protected and bound by the synthetic material.

Figure 3:
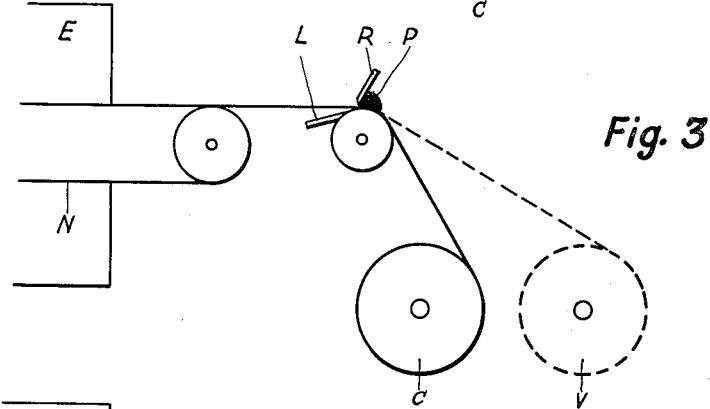
FIG. 3 illustrates diagrammatically a machine for carrying out the process.

FIG. 3 illustrates diagrammatically the manufacturing process. C is a coil of the thin absorbent paper and V is a coil of card web or of the very thin cloth incorporating glass fibres or other mineral or synthetic fibres acid proof against electrolytes. Sheet V is superposed on sheet C, and carried by a drum T beneath a spatula R which smears a polymerizable binder P on both superposed sheets C and V. In this manner the absorbent sheet C, suitably moistened, absorbs the binding mixtures P and, through the very thin sheet V, a quantity of synthetic resin, sufficient to protect and bind its fibres and to fix the paper C to the support V.

The attached sheet then passes by means of a conveyor belt N into a continuous drying room E, which provides for its drying and, if necessary, for the polymerization or stabilisation of the plastic resins. A blade L, may be provided for assisting removal of the sheet C from the drum T.

The dried sheet is subsequently transferred to a forming machine (not shown) in order to form the desired ribs upon its surface.

By means of this process, it is possible to obtain separators of excellent mechanical resistance, by using paper sheets of 0.1 to 0.2 mm. and very light supports (for instance: of 30 to 40 gr. per m.$^2$). Paper having parallel ribs may be used so that a separator, not adhering continuously to the active negative mass, simplifies the exit of occluded gas and provides a great advantage for electrical efficiency.

The advantage from a technical point of view and economy in production of the separator according to the invention in comparison with the prior art, is appreciated by the fact, that according to the known separators, paper with a thickness of 0.5 to 1 mm. or small glass felts of 100 gr. per m.$^2$ were used.

Figure 4:
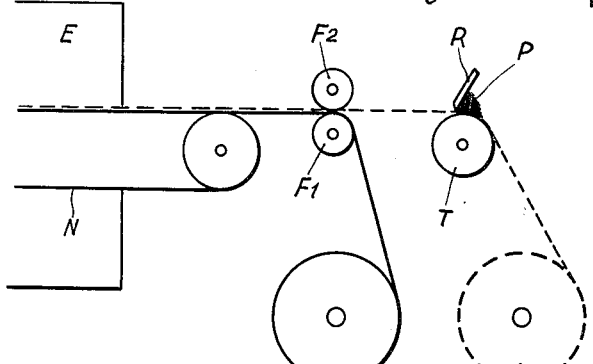
FIG. 4 illustrates diagrammatically another embodiment of the process.

FIG. 4 illustrates diagrammatically a modification of the process. In this figure it will be observed that sheet of the coil V is separately smeared on a drum T by means of spatula R, which applies the binding mixture P. This sheet V passes between calendering rollers F1 and F2 over the lower roller of which passes the absorbent paper of coil C, which is previously moistened by normal devices (not shown). The calendering rollers F1 and F2 compress the smeared sheet V against the absorbent paper C, which ensures that both sheets are united and the penetration into sheet C of resins contained in the binder P.

Figure 2:
Figure 5A:
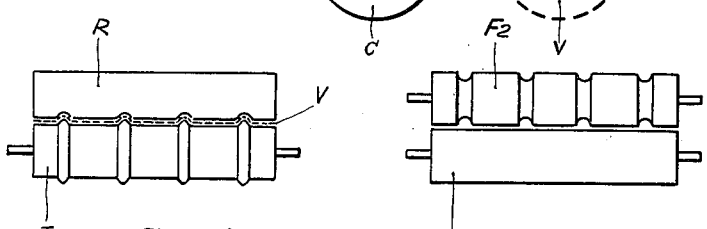
FIGS. 5a, 5b and 6 illustrate diagrammatically some details of modifications of FIG. 4.
Figure 6:
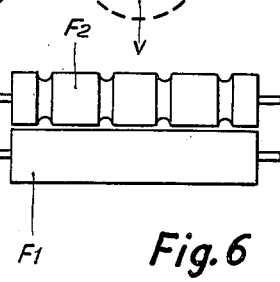

FIGS. 5a and 6 illustrate two modifications of FIG. 4 for manufacturing the separator in FIG. 2.

In FIG. 2 it will be observed that undulating ribs are only indicated on the microporous support V, while the paper C remains plane.

In order to obtain this, it is required that the drum T and the spatula R of FIG. 4 are designed as in FIG. 5a, i.e. by providing the drum T with peripheral projections and the spatula R with corresponding channels; in this manner, the sheet V is smeared and undulated at the same time. Both rollers F1 and F2 of FIG. 4 will be modified as indicated in FIG. 6, i.e. that the periphery of roller F1 remains smooth, while that of the cylinder F2 will be provided with peripheral grooves corresponding to the projections of sheet V.

Figures 5B, 7:
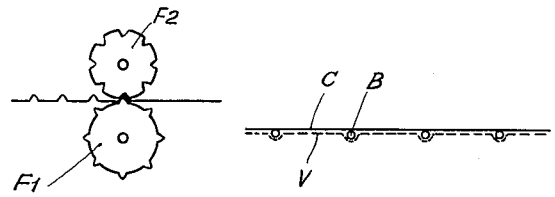
FIG. 7 illustrates in cross-section a second modification in the diaphragm formation.

To obtain alternatively sheets with transverse ribs, i.e. in the perpendicular sense to the transfer motion of the sheet, it is sufficient to modify the rollers F1 and F2 by replacing them with a roller F1 provided with teeth and a roller F2 with corresponding cavities, as indicated in FIG. 5b. In the use of these rollers a partial dissociation of the united sheets will be effected previously by heating both rollers F1 and F2, in order that the so formed ribs may be substantially stiffened.

FIG. 7 illustrates another modification in the manufacturing of the separator; here will be observed that the thin paper sheet C and the card web or thin cloth V have ropes B incorporated between them. These ropes B may be cylindrical, as illustrated, but they may be of other configurations. It is evident, that the ropes B remain permanently incorporated by the binder between the macroporous web V and the microporous absorbent paper C. This form of separator is made in a continuous manner by the manufacturing apparatus diagrammatically indicated in FIG. 8 which shows the card web or very thin cloth V, the absorbent paper C and coils of ropes B.

Figure 10:
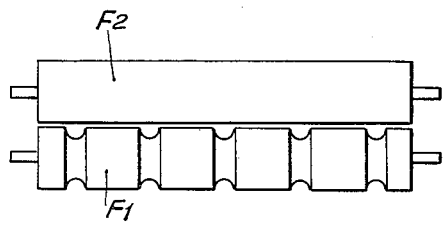

The rope may be a normal, twisted thread of glass fibres or other mineral, synthetic or artificial fibres, which is resistant or made impervious to electrolytes. Obviously filaments made of plastics such as polyvinylchloride, nitrocellulose, nylon or of suitable gum generally resistant to electrolyte attack, may be employed. As will be observed in FIG. 8, the paper sheet C is put above the smeared layer on the card web or thin cloth V. In fact, the card web V is carried by drum T beneath a plane spatula R, which spreads binding mixture P upon it. As it emerges from the mearing device, the smeared card web V is covered with the paper sheet C which is previously wetted and squeezed between two calendering rollers M1 and M2, the lower roller M1 of which rotates in a bath S. The smeared web V with the superposed paper C then proceeds between two compressing rollers F1 and F2 (see FIG. 10) and thence to a conveyor belt N into a continuous drying room E, which effects polymerisation.

Figure 8:
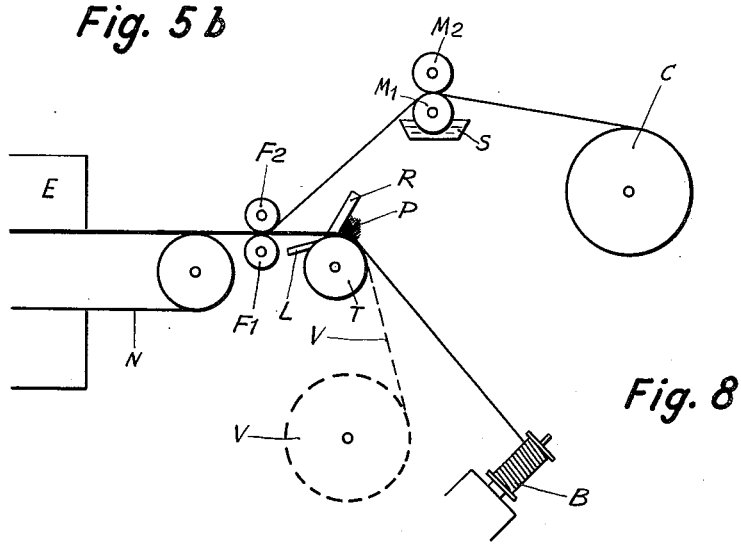
FIG. 8 illustrates diagrammatically a machine for making the modification of FIG. 7.
Figure 9:
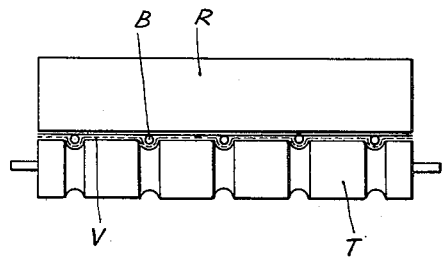
FIGS. 9 and 10 illustrate two details of the machine illustrated in FIG. 8.

As illustrated in FIG. 8, there is provided a scraping blade L, which facilitates the removal of the smeared web V from the drum T, while in FIG. 9 the grooved drum T, web V, ropes B and spatula R are diagrammatically represented for a better showing thereof.

Figure 1:
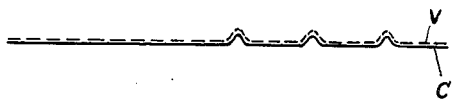
FIGS. 1 and 2 are transverse sections of two types of diaphragms obtained by the process according to the present invention.

It will be obvious, that with the machine diagrammatically illustrated in FIG. 8, it is possible to make a sheet without incorporating the ropes B, and to form it as in FIG. 1. It will be sufficient, for this purpose, that drum T and cylinder F1 be devoid of grooves and ropes B.

In order to make this invention clearer two examples of practical applications of the same will now be described.

*Example 1*

On a glass web, weighing 30–40 gr. per m.$^2$, carried by a drum, a binder is smeared as by spatula, at a rate of 300–500 gr. per m.$^2$; this binder is composed as follows:

| | Parts by weight |
|---|---|
| Resol phenol-formaldehyde | 10–20 |
| Water | 70 |
| Inert porous charges, as fossil flour, barium sulphate, kaolin, bentonite, wooden flour and like fillers | 15 |
| Thickening | 2 |
| Sodium hydrate, 10% | 3 |

On the smeared sheet is placed and then pressed an absorbent paper sheet of 30–50 gr. per m.$^2$, previously wetted and squeezed between calender rollers, with a watery solution of 2 to 15% of resol phenol-formaldehyde.

Ropes, when incorporated between card web and absorbent paper, are formed, for instance, of twisted glass fibres or of cotton impregnated with a solution of 5 to 20% of resol phenol-formaldehyde in water, and placed at a distance of 10–20 mm. apart. Qualification or diameter of said ropes will be chosen on the ground of thickness intended for the finished separator; afterwards the superposed sheets pass betwen two compressing cylinders in order to ensure a perfect adhesion and to remove any excess liquid in paper or binder.

The sheet is then dried by passing it through a drying room at a temperature increasing approximately from 70° to 160° F. for 2–3 minutes, and finally the sheet passes under infra-red rays, which cause a rapid polymerization of the resin.

*Example 2*

On a glass web of 40–50 gr./m.$^2$, carried by a drum, a binder is smeared as by means of a spatula, at a rate of 400—600 gr./m.$^2$. The binder is composed as follows:

| | Parts by weight |
|---|---|
| Polyvinylchloride latex at 35% | 15–25 |
| Water | 65–75 |
| Swelling bentonite | 5 |
| Sodium hydrate at 10% | 2 |
| Sodium silicate 35° Bé. | 1 |
| Inert porous charges | 0–2 |

On the smeared sheet is placed an absorbent paper sheet of pure cellulose of 30–50 gr./m.$^2$, previously impregnated and squeezed between calender rollers with a solution of polyvinylchloride latex at a concentration of 5 to 15%. Between the web and the absorbent paper several ropes are interposed at a distance of 10 to 20 mm.; these ropes are formed of faintly plasticized polyvinylchloride extrusions or semihard gum of a diameter depending upon the thickness desired for the separator.

The sheet and the ropes pass between calender rollers which ensure the perfect binding of the paper on the support lying below and remove excess liquid.

Afterwards the sheet is conveyed into a drying room heated at a temperature from 110° to 130° F. for about 5 minutes. This heat treatment assists in the drying of the sheet and the gelatinization of the polyvinylchloride latex. The sheet can now be cut according to predetermined measurements.

In both examples, it is proposed to use, as the binder, resol phenol-formaldehyde or polyvinylchloride latex. It is obvious that other thermohardening or thermoplastic resins may be used, provided that they be resistant to the electrolyte of electrolyte cells.

What I claim is:

1. A process for manufacturing microporous filtering diaphragms for storage batteries and electrolytic cells comprising the steps of applying a polymerizable binder to a main sheet of material consisting of acid proof fibers weighing 30 to 40 grams per square meter to form a machoporous structure, placing a thin absorbent sheet of cellulosic material weighing 30 to 50 grams per square meter and having a microporous configuration in contact with said main sheet of material, compressing said main sheet of material and said cellulosic sheet of material together so that said binder is adsorbed by said cellulosic sheet of material to cause said cellulosic sheet of material to adhere to said main sheet of material to form a thin composite sheet of structure while simultaneously forming ribs at spaced intervals therein, drying said composite sheet, and then polymerizing said binder.

2. A process according to claim 1 in which said acid proof fibers are glass wool.

3. A process according to claim 1 in which said acid proof fibers are selected from the group consisting of polyvinylchloride, nitrocellulose and nylon.

4. A process according to claim 1 in which said binder consists of 10 to 20 parts by weight of resol phenol-formaldehyde, 70 parts by weight of water, 15 parts by weight of inert porous substances, 3 parts by weight of a 10% solution of sodium hydrate, and 2 parts by weight of a thickener.

5. A process according to claim 1 in which said binder consists of 15 to 25 parts by weight of polyvinylchloride latex, 65 to 75 parts by weight of water, 5 parts by weight of bentonite, 2 parts by weight of a 10% solution of sodium hydrate, 1 part by weight of sodium silicate at 35° Bé., and 0 to 2 parts by weight of inert porous substances.

6. A process according to claim 1 in which said cellulosic sheet of material is impregnated prior to being placed in contact with said main sheet of material with a 2 to 15% solution of said polymerizable binder.

7. A process according to claim 1 comprising the further step of inserting acid proof ropes in said ribs between said main sheet of material and said cellulosic sheet of material as said ribs are being formed.

8. A process for manufacturing microporous filtering diaphragms for storage batteries and electrolytic cells comprising the steps of applying a polymerizable binder selected from the group consisting of resol phenolformaldehyde and polyvinylchloride in combination with water, bentonite and sodium hydrate to a main sheet of synthetic fibers selected from the group consisting of polyvinylchloride, nitrocellulose and nylon weighing 30 to 40 grams per square meter to form a macroporous structure, placing a thin absorbent sheet of cellulosic material weighing 30 to 50 grams per square meter and having a microporous configuration in contact with said main sheet of material, compressing said main sheet of material and said cellulosic sheet of material together so that said binder is absorbed by said cellulosic sheet of material to cause said cellulosic sheet of material to adhere to said main sheet of material to form a thin composite sheet of structure while simultaneously forming ribs at spaced intervals therein, drying said composite sheet and then polymerizing said binder.

9. A process according to claim 8 in which said cellulosic sheet of material is impregnated prior to being placed in contact with said main sheet of material with a 2 to 15% solution of said polymerizable binder.

10. A process according to claim 8 comprising the further step of inserting acid proof ropes in said ribs between said main sheet of material and said cellulosic sheet of material as said ribs are being formed.

References Cited in the file of this patent

UNITED STATES PATENTS

| | | |
|---|---|---|
| 1,295,660 | Willard | Feb. 25, 1919 |
| 2,043,954 | Kershaw | June 9, 1936 |
| 2,117,371 | Slayter | May 17, 1938 |
| 2,523,022 | Horstman | Sept. 19, 1950 |
| 2,607,810 | Walker | Aug. 19, 1952 |
| 2,758,630 | Hodge | Aug. 14, 1956 |
| 2,767,113 | Bower | Oct. 16, 1956 |

FOREIGN PATENTS

| | | |
|---|---|---|
| 678,719 | Great Britain | Sept. 10, 1952 |